United States Patent [19]

Smialkowski et al.

[11] 3,726,586

[45] Apr. 10, 1973

[54] WEDGE SHAPED OPTICAL BODY

[75] Inventors: Edwin J. Smialkowski, Philadelphia; Edgar R. Lang, Glenside, both of Pa.

[73] Assignee: Rohm and Haas, Philadelphia, Pa.

[22] Filed: Dec. 18, 1970

[21] Appl. No.: 99,562

[52] U.S. Cl............350/286, 260/31.8 M, 260/885, 350/178, 350/281
[51] Int. Cl.................................................G02b 5/04
[58] Field of Search..................260/31.8 M, 885, 260/41 AG, 89.5 R; 350/281, 287, 178, 286; 117/124

[56] References Cited

UNITED STATES PATENTS

| | | | |
|---|---|---|---|
| 3,362,942 | 1/1968 | Munn | 260/885 X |
| 2,962,471 | 11/1960 | Lang et al. | 260/827 |
| 3,402,004 | 9/1968 | Warhol | 350/281 |
| 3,154,600 | 10/1964 | Munn | 260/884 |

FOREIGN PATENTS OR APPLICATIONS

| | | | |
|---|---|---|---|
| 147,880 | 8/1950 | Australia | 260/885 |
| 870,191 | 6/1961 | Great Britain | 260/885 |

*Primary Examiner*—Lewis T. Jacobs
*Attorney*—George W. F. Simmons, Carl A. Castellan and Philip D. Freedman

[57] ABSTRACT

A wedge-shaped optical body that may be used as a component of a rear vision system for an automobile comprises a pair of rigid glass faces set at an angle of convergence to one another such that the angle is parallel to the longitudinal axes of the faces to form a prism or truncated prism and held by a flexible liquid tight spacer fitted to the perimeters of the glass faces and the formed prism or truncated prism filled with a cured poly(alkyl methacrylate). The poly(alkyl methacrylate) is prepared from a polymerizable syrup comprising (a) 10 to 70 parts by weight of a copolymer of at least two alkyl methacrylates wherein the alkyl group is saturated and contains one to 18 carbon atoms; (b) 90 to 30 parts by weight of a mixture of at least two polymerizable alkyl methacrylate monomers wherein the alkyl group is saturated and contains one to 18 carbon atoms; modified with (c) 0.1 to 2 parts by weight of at least one polyfunctional monomer capable of crosslinking the alkyl methacrylate monomers; (d) 0.5 to 15 parts by weight of a glass adhesion promoter, and (e) 5 to 20 parts by weight of a plasticizer; the syrup characterized in that the refractive index of (b), (c), (d), and (e) after polymerization is substantially the same as that of (a). The modified poly(alkyl methacrylate) composition exhibits excellent adhesion to glass and is optically transparent.

4 Claims, 1 Drawing Figure

PATENTED APR 10 1973
3,726,586
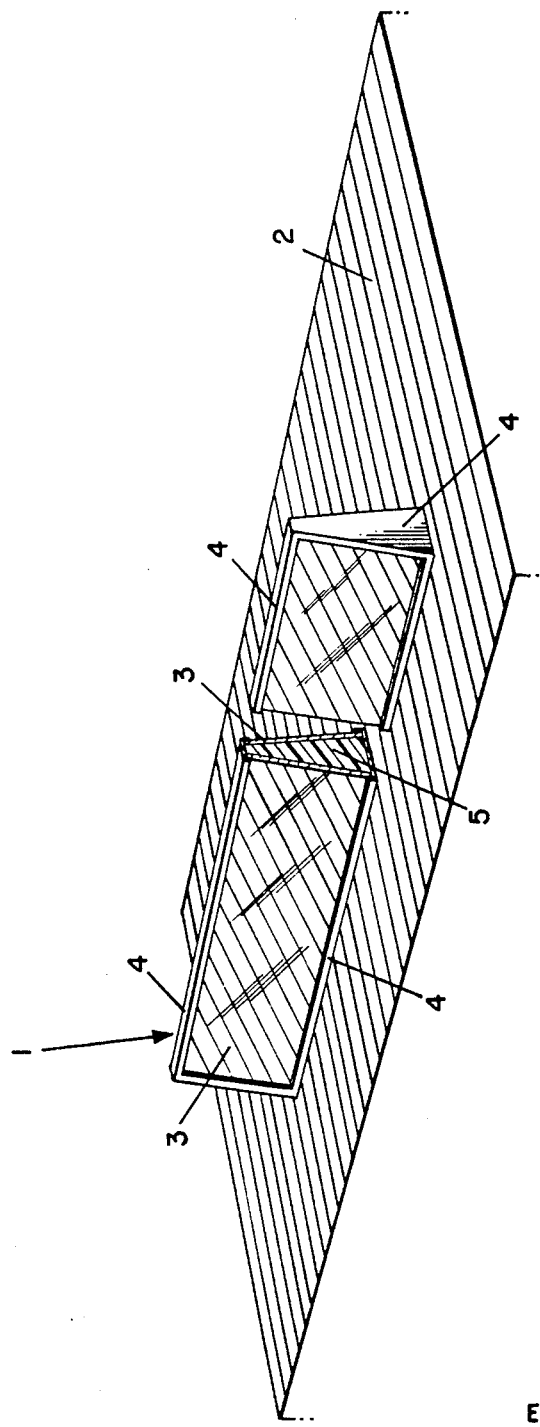
INVENTORS
EDGAR R. LANG and
EDWIN J. SMIALKOWSKI
BY Philip D. Freedman

WEDGE SHAPED OPTICAL BODY

The present invention relates to a wedge-shaped optical body that may be used as a component of a rear vision system for an automobile. The drawing is a perspective view sectioned to show construction details of the optical body. The present invention also relates to a polymerizable syrup which may be cured to form part of the shaped optical body.

An optical device useful as a component in a automobile rear view mirror or in any optical sighting equipment must meet certain rigid standards of quality. The device must be optically perfect with a minimum of striation, haze, occlusion of dirt particles or color. If the device is a laminate, there must be no tendency for the respective compositional layers to separate from one another over a temperature range normally encountered by a vehicle subjected to the extremes of usual weather conditions. Finally, the device assembly must exhibit reasonable strength characteristics at these temperatures. The device of the present invention satisfies these criteria.

Lang et al., U.S. Pat. No. 2,962,471 teaches compositions suitable for bonding glass to plastic surfaces. The compositions are useful for producing sheet laminates consisting of two plates of glass with a plastic inner layer. Schreiber et al., U.S. Pat. No. 3,382,137, May 7, 1968 shows a laminated sheet structure of thin glass bonded together with a cured synthetic resin layer and Lang et al., U.S. Pat. No. 3,237,911, Mar. 1, 1966 discloses the preparation of a plurality of wedge-shaped plastics.

The present invention is a wedge-shaped optical body comprising: a pair of rigid glass faces set at an angle of convergence to one another such that the angle is parallel to the longitudinal axes of the faces to form a prism or truncated prism; a flexible liquid tight spacer fitted to the perimeters of the glass faces holding the faces in the shape of the prism and forming the two ends, bottom and top of the prism structure; and a core of optically transparent, cured poly(alkyl methacrylate) within the formed prism and firmly attached to the glass faces and to the flexible spacer.

The drawing is a perspective view, partially cut away, of the optical body of the present invention. The optical body is in the shape of a truncated prism or wedge. The body 1 is set on a parallel lined background 2 used to illustrate its optical properties. The body 1 comprises a pair of rigid glass faces 3, a flexible poly(vinyl chloride) spacer 4 around the perimeter of the assembly holding the walls at a desired angle of convergence, and a core of optically transparent, cured poly(alkyl methacrylate) 5 tenaciously attached to the glass faces and to the spacer.

The spacer 4 may be made of any suitable material so long as it is flexible enough to allow movement of the glass faces during curing to the extent necessary to accommodate the vinyl shrinkage that occurs during polymerization. The spacer must also be of such material that it does not dissolve in the syrup composition and does not interfere in any way with the polymerization process. Preferably the spacer 4 is of poly(vinyl chloride).

The glass faces 3 also may be made of any suitable type of glass as long as it fulfills the optical requirements for forming an optical body useful as a component in an optical sighting device such as an automobile rear view mirror. It is a particular advantage of the present invention that ordinary window glass is quite suitable. Generally glass of thickness between 0.05 and 0.25 inch is suitable in the present invention while glass of 0.09 to 0.15 inch in thickness is preferred.

The shape of the optical body 1 of the present invention is of importance. The body, to be suitable as a component in a rear vision system for an automobile, must be in the shape of a wedge or prism i.e., in the shape of a polyhedron with two faces that are polygons in parallel planes and the other faces parallelograms. In other words, the optical body of this invention is a transparent body bounded in part by two transparent plane faces so arranged so as to deviate or disperse a beam of light in the direction desired.

The present invention also relates to the polymerizable syrup, used to prepare the poly(alkyl methacrylate) core 5 of the wedge-shaped optical body. The syrup comprises (a) 10 to 70 parts by weight of a polymer of at least two alkyl methacrylates wherein the alkyl group is saturated and contains one to 18 carbon atoms; (b) 90 to 30 parts by weight of a mixture of at least two polymerizable alkyl methacrylate monomers wherein the alkyl group is saturated and contains one to 18 carbon atoms; modified with (c) 0.1 to 2 parts by weight of at least one polyfunctional monomer capable of cross-linking the alkyl methacrylate monomers; (d) 0.5 to 15 parts by weight of a glass adhesion promoter; and (e) 5 to 20 parts by weight of a plasticizer; the syrup characterized in that the refractive index of (b), (c), (d), and (e) after polymerization is substantially the same as that of (a).

Calkins et al., U.S. Pat. No. 3,153,022, Oct. 13, 1964, relates to a stable syrup of methyl methacrylate monomer and a polyfunctional monomer of the formula

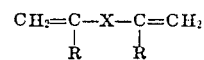

wherein X is a carboxyl-containing divalent radical or phenylene and R is hydrogen or alkyl. The syrup also contains a copolymer of the methyl methacrylate and the polyfunctional monomer. Munn, U.S. Pat. No. 3,154,600, Oct. 27, 1964, shows a syrup containing 10 to 35 percent by weight of methyl methacrylate polymer dissolved in monomeric methyl methacrylate and a chain transfer agent.

The present invention relates to a syrup of a polymer of at least two alkyl methacrylates dissolved, suspended or dispersed in a mixture of at least two saturated alkyl methacrylates, and further containing a polyfunctional monomer, a plasticizer and a glass adhesion promoter. It has been found that this particular syrup remains flexible at low temperatures but does not flow at elevated temperatures and exhibits excellent adhesion to glass and appears optically homogeneous, i.e., transparent when fully cured. Each of the alkyl methacrylate copolymer, the alkyl methacrylate monomers, the polyfunctional monomer, the plasticizer and the adhesion promoter must be present in the compositions of the present invention in order to provide, when cured, a satisfactory core for the wedge-shaped optical device. No novelty appears to reside in any particular one of the syrup components but invention is believed to reside in the cooperative and interdependent manner in which the components are combined to achieve the desired results mentioned supra.

The plasticizer and the glass adhesion promoter are of critical importance to the syrup compositions of the present invention. It has been found that the wedge-shaped prisms of the present invention must have a flexible rather than rigid core of cured poly(alkyl methacrylate). It has been found that poly(alkyl methacrylate) syrups such as the prior art syrup compositions not containing a plasticizer produce rigid structures unsuitable for use in optical bodies in rear vision systems for automobiles. Possibly because of the particular wedge-shape of the present optical bodies, prism structures such as would be produced from syrups of the patents mentioned supra or prism structures as would be produced by a procedure analogous to those used to produce the sheet laminates of the patents also mentioned supra, would be rigid and brittle and would not produce an article which would withstand service temperature to which optical devices would be subjected. The optical bodies thus produced would tend to delaminate, deform or break at the glass surface. The plasticizers used in this invention are present in the syrup compositions in quantities of 5 to 20. Suitable examples of such plasticizers include dioctyl phthalate, dicapryl phthalate, dimethyl phthalate, dibutyl phthalate, and alkyl benzyl phthalate.

The glass adhesion promoter is also critical to the syrup composition of the present invention. The cured core composition must be firmly adhered to the glass plates of the prism, otherwise air spaces will appear between the composition and the plates and the necessary optical homogeneity of the wedge is destroyed.

The adhesion promoter must be capable of chemically bonding to the glass surface and must be polymerizable or reactable with the monomers of the filler syrup. The preferred adhesion promoters are those disclosed by Lang et al., U.S. Pat. No. 2,962,471. These promoters include (1) glycidyl acrylate or methacrylate or an hydroxyalkyl acrylate or methacrylate in which the alkyl group has from two to four carbon atoms, (2) acrylic or methacrylic acid, (3) alkenyl tri-(alkoxy) silane in which the alkenyl group has from two to four carbon atoms and in which the alkoxy group contains one to four carbon atoms, and most preferably (4) a combination of all three components, (1), (2) and (3) above. When all three components (1), (2) and (3) are used as the adhesion promoters each of (1), (2) and (3) are present in the syrup in parts by weight as follows: (1) 0.2 to 5 parts, (2) 0.2 to 4 parts and (3) 0.2 to 5 parts. The total amount of adhesion promoters present is 0.5 to 15 parts preferably 0.6 to 3 parts by weight. At least one polyfunctional — preferably bifunctional — monomer capable of crosslinking the syrup must be present in the composition in order to crosslink the resulting gel so that it will not flow at elevated temperatures. At the same time the presence of the crosslinking monomer allows the resulting gel to remain flexible enough to withstand strains introduced at low temperatures. The syrup preferably contains 0.1 to 2 parts by weight of the crosslinking monomer. Suitable crosslinking monomers include divinyl esters of di- or tribasic acids, such as divinyl adipate; dialkyl esters of polyfunctional acids such as dialkyl phthalates; dialkyl esters of polyfunctional acids such as dialkyl maleate and dialkyl fumarate; divinyl ethers of polyhydric alcohols, such as divinyl ether of ethylene glycol; and di- and trimethacrylic and acrylic esters of polyhydric alcohols, for example, ethylene glycol dimethacrylate, propylene glycol dimethacrylate, 1,3-butylene glycol dimethacrylate, 1,4-butylene glycol dimethacrylate; divinyl aromatics such as divinyl benzene; etc. and mixtures of any of the foregoing.

Suitable polymers for the syrup are those prepared from at least two alkyl methacrylates wherein the alkyl is of one to 18, preferably two to four carbon atoms, for example a copolymer of butyl methacrylate and ethyl methacrylate. Suitable polymers also include copolymers of at least two alkyl methacrylates and other polymerizable monoethylenically unsaturated monomers such as monovinylidene monomers free of active hydrogen wherein the polymer is of at least 50 percent of the alkyl methacrylates. Such suitable monomers include methyl acrylate, ethyl acrylate, styrene, methyl styrene, vinyltoluene, vinyl naphthalene and similar unsaturated monomers. Another class of suitable monoethylenically unsaturated monomers includes the lower alkyl esters of itaconic acid, fumaric acid and the vinyl esters of alkanoic acids such as vinyl acetate and vinyl stearate.

Suitable monomers for forming the syrups are those alkyl methacrylates wherein the alkyl group is of one to 18, preferably two to four carbon atoms; for example; butyl methacrylate and ethyl methacrylate. Suitable monomers also include the monoethylenically unsaturated monomers listed supra as suitable for forming the polymer component. Although a wide range of monomers may be used with a wide variety of polymers in the syrups of this invention, it is necessary that the refractive index of the respective components in the cured core of the wedge-shaped body be substantially the same to assure a transparent product free of striation.

The syrup may contain 10 to 70 parts by weight preferably 40 to 55 of the alkyl methacrylate polymer and 90 to 30, preferably 60 to 45 of the monomers.

A preferred composition is a syrup containing 10 to 70 preferably 40 to 55 weight percent of a copolymer of butyl methacrylate (BMA) and ethyl methacrylate (EMA) in a ratio of BMA:EMA of between 2:1 to 1:2 preferably about 1:1; dissolved in 90 to 30 preferably 55 to 45 weight percent of butyl methacrylate and ethyl methacrylate monomers in an ratio of BMA:EMA of between 2:1 to 1:2, preferably about 1:1.

The syrup of the invention may be prepared by any suitable process, for example, such as by polymerizing monomers (i.e. at least two alkyl methacrylates) and adding the resulting polymer to a monomer mixture. In such a method, a suitable chain transfer agent such as an aliphatic mercaptan having one to 18 carbon atoms is present during polymerization of the base polymer to control molecular weight so that the inherent viscosity of the syrup is in accord with prior art processes.

The syrup may also be made by heating a small amount of polymerization initiator in solution with at least two methacrylic esters in the presence of a chain transfer agent at suitable pressure and temperature until the solution has reached a predetermined viscosity. Thereafter the hot solution is quenched either by cooling with the subsequent addition of a polymerization inhibitor or by the addition of cold monomers containing a polymerization inhibitor.

In another process, a syrup having a viscosity between about 200 and 500 cps. at 25° C. and preferably between 300 and 400 cps. at that temperature, can be produced in a stirred jacketed kettle by refluxing at least two alkyl methacrylates at atmospheric pressure in the presence of a predetermined small amount of initiator and a chain transfer agent such as n-dodecyl mercaptan in amount of from 1 to 4 weight percent and preferably from 2.5 to 3 percent. The resulting solution is heated at a temperature between 90 and 105° C. and preferably 96 to 102° C. until the predetermined viscosity has been attained. The polymerization is then stopped by cooling in any suitable manner, as, for example — and preferably — by the addition of from 40 to 50 percent by weight of cold alkyl methacrylate monomers containing sufficient hydroquinone to inhibit completely further polymerization under storage conditions. The difunctional monomer, plasticizer and adhesion promoter are then added to the composition.

The syrup of this invention is poured into a mold for forming a wedge shaped optical body and is cured therein by any procedure known in the art. The mold consists of the poly(vinyl chloride) (or other suitable material) spacer and glass plates which form component parts of the resulting optical body described supra.

The syrup should be thickened to reduce or eliminate volume shrinkage during curing in the glass/spacer mold. The syrup should be as thick as possible so long as it remains pourable and curable. The viscosity can be increased by dissolving therein polymers formed by polymerizing the methyl, ethyl, isopropyl, cyclohexyl, isobornyl, benzyl, tert-butyl, tert-amyl, 2-ethylhexyl, dodecyl esters of acrylic and methacrylic acids or copolymers of such esters with other copolymerizable monoethylenically unsaturated monomers as set forth hereinbefore to the extent of 1 to 30 parts by weight of polymer or copolymer dissolved in 99 to 70 parts by weight of the monomer of monomeric mixture. Other preformed polymers which are soluble in and compatible with the monomeric mixture and compatible with the polymerized mixture may be used to thicken the monomeric mixture so long as the cured composition will remain transparent and flexible. The syrup will also contain a suitable polymerization catalyst such as a free radical generating catalyst. The organic peroxides represent one suitable class of free radical generating catalysts, typical of which include benzoyl peroxide, tert-butyl hydroperoxide, cumene peroxide, tetralin peroxide, acetyl peroxide, caproyl peroxide, tert-butyl perbenzoate, tert-butyl diperphthalate, methyl ethyl ketone peroxide, etc. The amount of peroxide catalyst required is roughly proportional to the concentration of the mixture of monomers. The usual range is 0.01 to 3 percent of catalyst with reference to the weight of the monomer mixture. The preferred range is from 0.02 to 0.5 percent, while the range of 0.02 to 0.25 percent is usually best. The optimum amount of catalyst is determined in large part by the nature of the particular monomers selected, including impurities which accompany said monomers.

To assist those skilled in the art in the practice of the present invention, the following modes of operation are set forth as illustrations, parts and percentages by weight unless otherwise noted.

EXAMPLE 1

The following procedure illustrates the preparation of a composition suitable for forming the polymerizable syrup for use in the optical device of the present invention:

Into a mix tank equipped with a stirring device are added a mixture of 50 parts butyl methacrylate containing 10 ppm. methyl ethyl hydroquinone and 50 parts ethyl methacrylate containing 15 ppm. methyl ethyl hydroquinone, 2 parts n-dodecyl-merpcaptan and 0.2 part t-dodecyl-mercaptan. The mixture is stirred until a homogeneous solution forms. To the mixture is added 0.1 part of a t-butyl peroctoate catalyst. The reaction mixture is filtered, outgassed under reduced pressure, back flushed with nitrogen and poured into suitable molds and polymerized into ½ to 1 inch thick slabs on an 18 hour at 66° C., 2 hours at 80° C., 1 hour at 120° C. cure cycle. The approximate molecular weight of the resulting polymer is ($\overline{M}w$) 26,000.

To a reactor capable of mixing a 320 cps. viscosity composition are added 23 parts butyl methacrylate, 23 parts ethyl methacrylate, 0.5 parts 1,3-butylene dimethacrylate, 0.2 parts glycidyl methacrylate, 0.5 part glacial methacrylic acid and 0.2 part methacryloxypropyl triethoxysilane. The mixture is stirred and 53 parts of polymer prepared above are added. Stirring is continued until the polymer is completely dissolved; 0.2 part bis-hydroxyethyl-p-toluidine is added and stirring is continued until a clear syrup is obtained.

A plasticizer, 9.5 parts of butyl benzyl phthalate, is added to 87 parts of the syrup and the resulting mixture pressure filtered. Catalyst, 0.5 part, t-butyl peroctoate and 3 parts of a 3.5 percent benzoyl peroxide solution in butyl benzyl phthalate, are added to the mixture which is then degassed and blanketed with nitrogen.

EXAMPLE 2

This example illustrates the preparation of an optical body according to the present invention.

Components of a poly(vinyl chloride) spacer are molded in a brass die in a hydraulic press at about 340° F. The components consist of a bottom gasket section approximately 18 inches long with retaining grooves running longitudinally along the section and set to hold two glass faces at an 18° angle so as to form a wedge approximately 18 inches long, 1 inch wide and 3 inches high, a top gasket section of the same length as the bottom with retaining grooves set approximately one-eighth of an inch apart to hold the tops of the glass faces, and truncated tranangular-shaped end gaskets also grooved; the grooved poly(vinyl chloride) gaskets together effecting a liquid light seal with one another and with the glass faces. The four components of the assembly are heat sealed together to form a flexible spacer frame indicated 4 in the drawing.

The inside surface of the spacer is wiped clean with a cloth with a dilute solution of benzoyl peroxide in dibutyl phthalate which acts as an adhesion promoter and helps to eliminate interface distortion between the polymer and the spacer elements. Clean glass plates indicated 3 are inserted into the grooves of the spacer and a thin hot gelatin glue line is applied around the external contact points between the glass and the spacer to assure a liquid seal against monomer leakage from the assembly.

The mold formed by the glass 3 and spacer 4 is flushed with nitrogen, filled with the catalyzed and degassed syrup and rapidly sealed. The composition exotherm reaches a temperature between 55° and 70° C. within 50 and 60 minutes after degassing. Polymerization is substantially complete after about 1½ hours. The composition is post cured for 60 minutes at 80° C. in an air circulating oven to produce a finished wedge as shown in the drawing.

What is claimed is:

1. A wedge-shaped optical body useable as a component of a rear vision system for an automobile and comprising: a pair of rigid glass faces set at an angle of convergence to one another such that the angle is parallel to the longitudinal axes of the faces to form a wedge; a flexible spacer fitted liquid tight to the perimeters of the glass faces, holding the faces in the shape of the wedge; and a core of optically transparent, cured poly(alkyl methacrylate) within the wedge, said poly(alkyl methacrylate) polymerized from a syrup comprising (a) 10 to 70 parts by weight of a copolymer of at least two alkyl methacrylates wherein the alkyl group is saturated and contains one to 18 carbon atoms; (b) 90 to 30 parts by weight of a mixture of at least two polymerizable alkyl methacrylate monomers wherein the alkyl group is saturated and contains one to 18 carbon atoms; modified with (c) 0.1 to 2 parts by weight of at least one polyfunctional monomer capable of crosslinking the alkyl methacrylate monomers; (d) 0.5 to 15 parts by weight of a glass adhesion promoter, and (e) 5 to 20 parts by weight of a plasticizer; the syrup characterized in that the refractive index of the product of (b), (c), (d) and (e) after polymerization is substantially the same as that of (a).

2. The wedge-shaped optical body of claim 1 wherein (a) comprises a polymer of at least two alkyl methacrylates wherein the alkyl group contains two to four carbon atoms and wherein (b) comprises a mixture of at least two polymerizable alkyl methacrylates wherein the alkyl group contains two to four carbon atoms.

3. The wedge-shaped optical body of claim 1 wherein copolymer (a) is a copolymer of butyl methacrylate and ethyl methacrylate and wherein the alkyl methacrylate monomers (b) are butyl methacrylate and ethyl methacrylate.

4. The wedge-shaped optical body of claim 1 wherein the adhesion promoter comprises (1) 0.2 to 5 parts by weight glycidyl acrylate or methacrylate in which the alkyl group has from two to four carbon atoms, (2) 0.5 to 4 parts by weight acrylic or methacrylic acid and (3) 0.2 to 5 parts alkenyl tri- (alkoxy) silane in which the alkenyl group has from two to four carbon atoms and in which the alkoxy group contains one to four carbon atoms.

* * * * *